Feb. 12, 1957  J. W. LUENING  2,781,413
DEFERRED-ACTION BATTERY
Filed Feb. 18, 1954  2 Sheets-Sheet 1
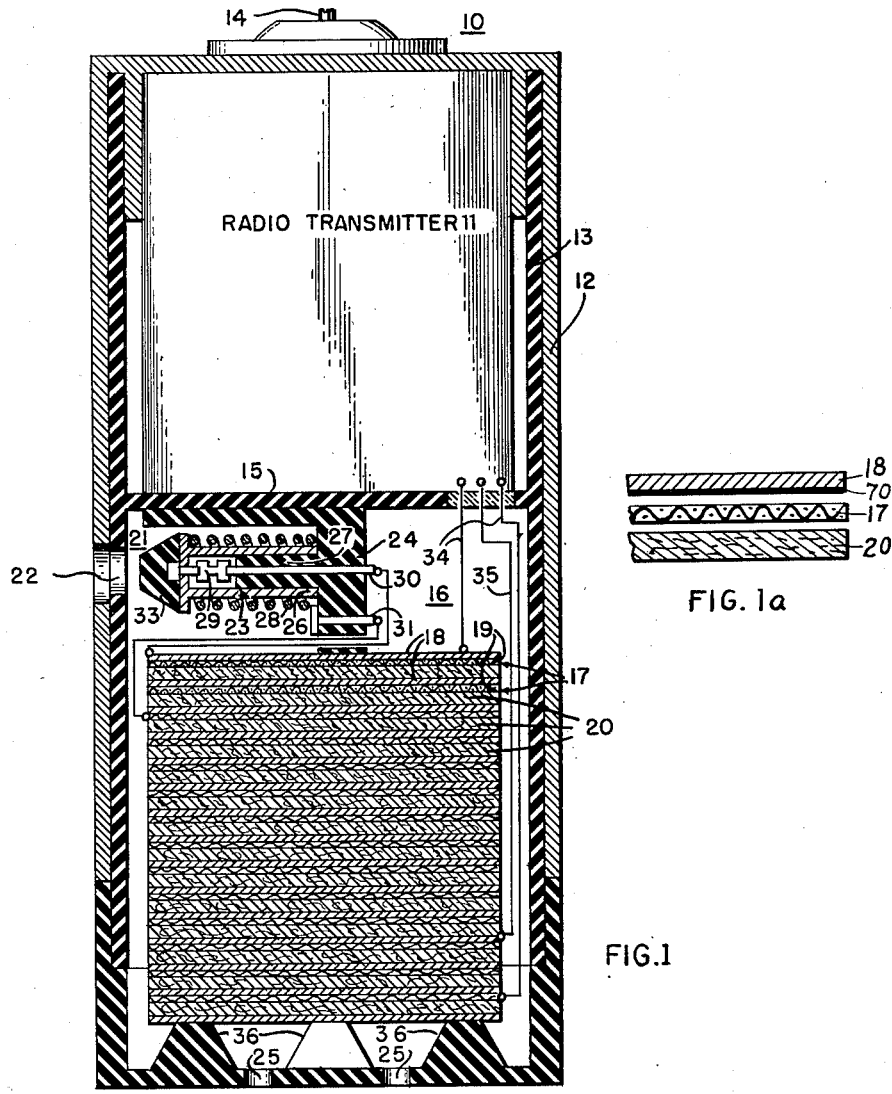
FIG. 1a
FIG. 1
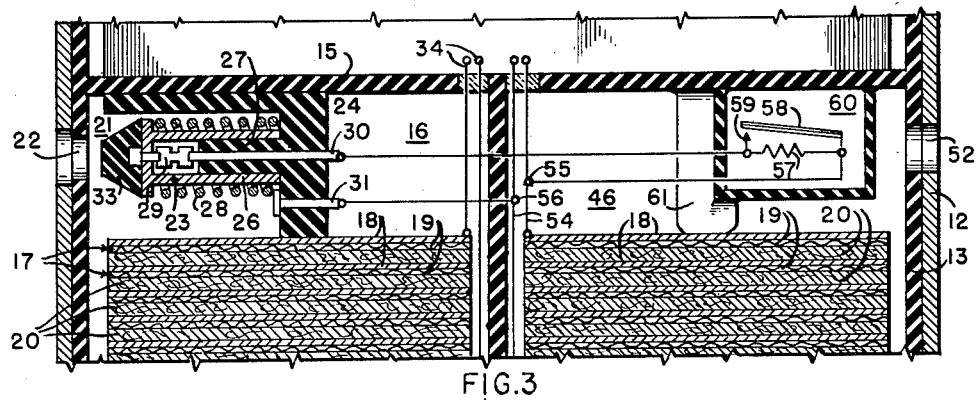
FIG. 3

Feb. 12, 1957  J. W. LUENING  2,781,413
DEFERRED-ACTION BATTERY
Filed Feb. 18, 1954  2 Sheets-Sheet 2

United States Patent Office 2,781,413
Patented Feb. 12, 1957

2,781,413

DEFERRED-ACTION BATTERY

James W. Luening, Great Neck, N. Y., assignor to Hazeltine Research, Inc., Chicago, Ill., a corporation of Illinois Application February 18, 1954, Serial No. 411,210

17 Claims. (Cl. 136—112)

GENERAL

The present invention is directed to deferred-action batteries and, more particularly, to fluid-activated batteries or battery assemblies.

Deferred-action batteries have utility in a variety of applications such as in floating radio transmitters which transmit distress signals that may be used to establish the location of lifeboats or rafts of disabled vessels or aircraft. Deferred-action batteries contain a plurality of special battery cells arranged or stacked in a suitable container. These cells include electrodes of particular chemical elements and chemical compositions which, when wet or saturated with a fluid such as water, become activated shortly thereafter and capable of delivering electrical current to an electrical circuit such as the radio transmitter. The wetting of the batteries is ordinarily accomplished by dropping the radio transmitter and its deferred-action battery into the water so that the battery may absorb through its perforated container the water which is necessary for activating purposes.

Batteries of the type under consideration which develop a relatively high voltage, for example about 150 volts, require the removal of the free liquid or water from the battery cells after they have become wet by immersion for the purpose of reducing the flow of short-circuiting currents within the battery cells. The chemical constituents of such batteries often liberate gases during the course of activation and if, as in prior such batteries, an evacuated battery container was employed to which water was admitted as by the puncturing of a seal over a water-admitting port, the generated gases would impede or prevent the effective flow of activating water into the container and thus prevent the battery cells from being properly activated.

Some water-activated battery assemblies may comprise two batteries, one of which forms the +B supply and the other the filament supply for a device such as a radio transmitter. The filament-supply battery develops a relatively low voltage of about 6 volts and does not ordinarily require the removal of the free water from the cells thereof after saturation. However, it has been determined that after the cells of the filament-supply battery have been immersed in water and substantial activation has taken place, a relatively large momentary flow of current drawn from the battery will cause the electrodes or the chemicals of the battery cells to function in a manner which accelerates complete activation. From the standpoint of the conservation of energy, it would therefore appear desirable to use this large flow of energy for an additional useful purpose.

It is an object of the invention, therefore, to provide a new and improved deferred-action battery which is effective to make use of at least some of the gases liberated by the chemicals of the battery cells when the latter are wet with an activating fluid.

It is also an object of the invention to provide a new and improved deferred-action battery which is simple in construction, has a long shelf life, is capable of withstanding rough handling prior to immersion in activating fluid, and yet assures reliable operation when immersed in that fluid.

It is another object of the invention to provide a new and improved fluid-activated battery assembly which is effective to use the large momentary flow of activating current of one of the fluid-activated batteries of the assembly to actuate control mechanism for the other battery prior to the complete activation of that other battery.

It is an additional object of the invention to provide a new and improved fluid-activated battery assembly comprising a B battery and an A battery wherein complete activation of the B battery can take place only after the activation of the A battery.

In accordance with the invention, a deferred-action battery comprises a battery cell requiring wetting with fluid to initiate activation and subsequent removal of fluid therefrom upon substantial activation. The battery also includes a container enclosing the aforesaid cell and including a gas valve having a vent with a closure mechanism therefor open at about the time of the wetting and including a fluid valve having at least one port for emitting the fluid to displace the gas in the container through the vent and thereby initiate activation. The deferred-action battery further includes means for liberating a fluid-displacing gas in the container upon substantial activation. The aforesaid closure mechanism includes means responsive in a time corresponding to sufficient displacement of the first-mentioned gas in the container and the above-mentioned substantial activation for closing the vent, whereby the fluid-displacing gas expels the fluid through at least one of the ports and conditions the battery for operation.

For a better understanding of the present invention, together with other and further objects thereof, reference is had to the following description taken in connection with the accompanying drawings, and its scope will be pointed out in the appended claims.

Referring now to the drawings:

Fig. 1 is a longitudinal sectional view of a radio transmitter which includes a deferred-action battery in accordance with the present invention;

Fig. 1a is an enlarged fragmentary exploded sectional view of a portion of the deferred-action battery of Fig. 1;

Fig. 3 is a fragmentary longitudinal sectional view of a portion of a radio transmitter and another form of deferred-action battery assembly.

Figure 2:
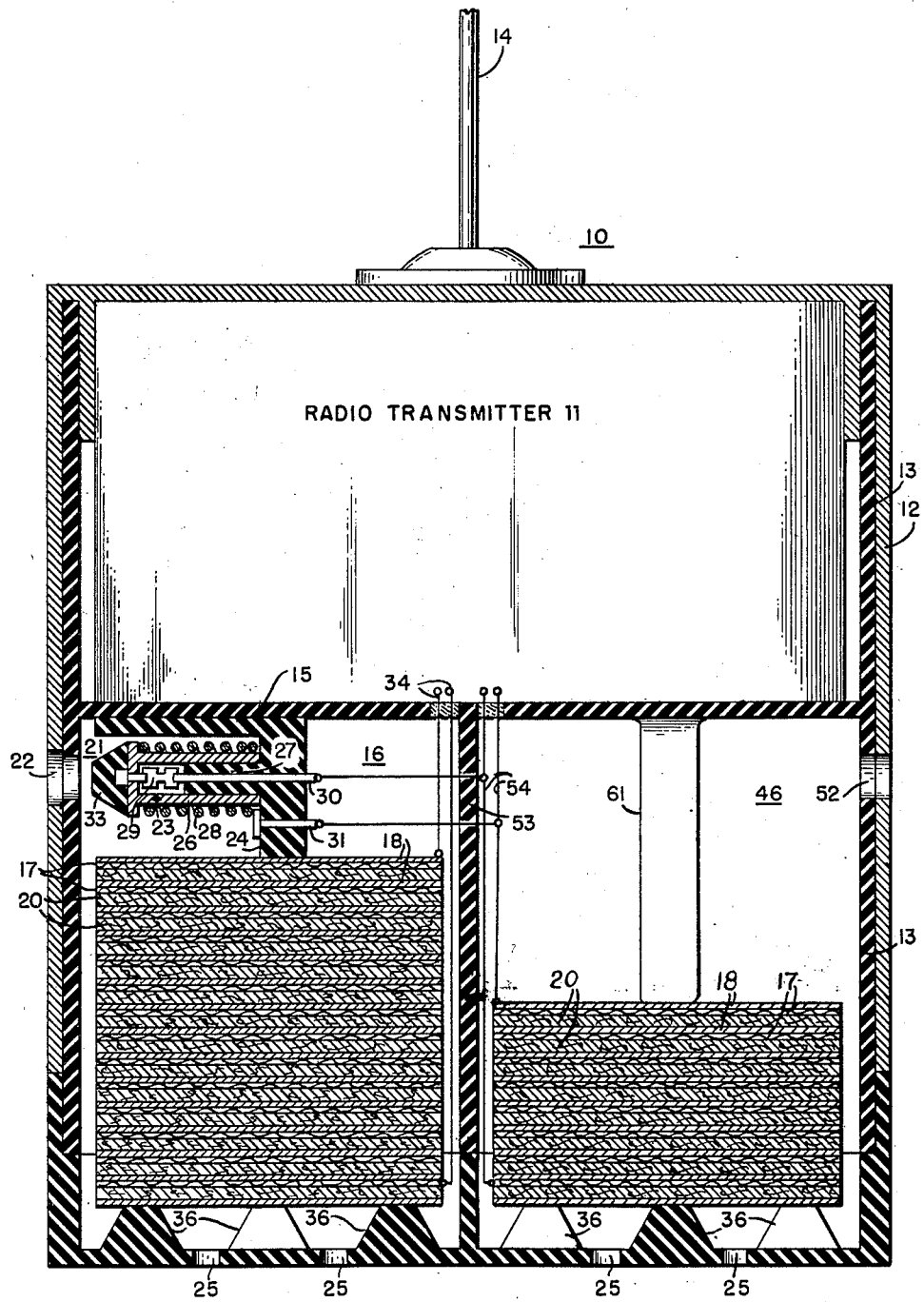
Fig. 2 is a similar sectional view of a radio transmitter including a deferred-action battery assembly in accordance with a modified form of the invention.

Description of transmitter and deferred-action battery of Fig. 1

Referring now more particularly to Fig. 1, there is represented a radio apparatus 10 comprising a radio transmitter 11 of conventional construction enclosed in a metallic outer casing 12 which, in turn, encloses a suitable container 13 of insulating material. The transmitter 11 is provided with a suitable external antenna 14 substantially mounted on the top of the container 13. The transmitter rests on a shelf 15 of insulating material which creates a battery compartment in the lower portion of container 13. The battery compartment contains a deferred-action battery 16 ordinarily comprising a plurality of stacked battery cells 17, 17 requiring wetting with or immersion in a suitable fluid such as water to initiate activation, followed by the subsequent removal of the fluid therefrom upon substantial activation. The cells may comprise a plurality of spaced electrodes of suitable materials such as magnesium plates 18, 18, which form the positive electrodes. Each of these electrodes has a bronze screen 19 secured to a thin copper plate 70 (see Fig. 1a) on the underside thereof. This screen serves to retain in the interstices thereof a paste of a suitable material or salt such as silver or copper chloride which, when wet or immersed in a suitable fluid such as water, serves to form the negative terminal of a cell after a short activation period. The cells are separated from each other by layers of dry porous material 20, 20 such as cotton.

The upper portion of container 13 includes a gas or air valve 21 having an aperture or vent 22 with a closure mechanism 23 therefor which is open at about the time of the wetting of the battery cells 17, 17. This closure mechanism will be described more fully subsequently. The container 13 also includes a fluid valve which may be in the form of one or more ports 25, 25 in the bottom of the container for admitting the fluid to displace the gas or air in the container through the vent 22 and thereby initiate activation in a manner also to be explained subsequently. The dimensions of the vent 22 and the ports 25, 25 are selected to control the rate of air displacement in the container 13 when the apparatus 10 is dropped or placed in a fluid such as water, thereby to control the rate of admission of water through the ports 25, 25 and in turn the activation of the cells 17, 17.

The fluid-activated battery further includes means for liberating a fluid-displacing gas in the container 13 upon substantial activation of the battery. This means may comprise the cells themselves, as in the Fig. 1 embodiment under consideration, which comprises a deferred-action source for liberating a gas after being wet or saturated with water, or may comprise auxiliary means such as a valved container of compressed air or effervescent materials for assisting the battery chemicals in liberating sufficient quantities of a gas or gases for displacing the water in the container 13. Alternatively, the deferred-action gas liberating means may in the absence of gas liberation by the cells themselves be effective to displace the fluid admitted to the container through the ports 25, 25.

The closure mechanism 23 of the deferred-action battery includes time-delay means responsive in a time corresponding to sufficient displacement of gas or air which is in the container 13 prior to immersion and to subsequent activation of the cells for closing the vent 22, whereby the fluid-displacing gas generated within the container expels the fluid through at least one of the ports 25, 25 and conditions the battery for operation or complete activation. To this end, the closure mechanism comprises a metallic cylindrical plunger 26 slidably mounted on an insulating cylindrical guide 27 which forms an extension of an insulating member 24 attached to the shelf 15. The plunger 26 is biased for movement in the direction of the vent 22 by a compressed coil spring 28. However, the plunger is restrained from such movement by an electrical fuse or fusible conductor 29 secured between the outer end of the plunger 26 and a conductor 30 embedded in the insulating guide 27. One end of the spring 28 rests on or may comprise an extension forming a conductor 31 which is embedded in the member 24. Conductors 30 and 31 are electrically connected to a predetermined number of cells of the battery 16 such as to an upper group of cells which, when substantially activated, develop a voltage of about 6 volts. The outer end of the plunger 26 contains a tapered plug or closure 33 of suitable material such as rubber and is adapted to seal the vent 22 when forced into engagement therewith by the spring 28 in a manner to be described subsequently.

Predetermined cells of the battery are connected in a suitable manner as by conductors 34, 34 and 34, 35 to the radio transmitter 11 for energizing the anode and filament circuits respectively of the electron tubes of the transmitter. The battery cells rest on insulating supports 36, 36 which are spaced to allow fluid admitted through the ports 25, 25 to rise when the vent 22 is open and permeate the porous material 20 between the individual cells of the battery. The member 24 also serves with supports 36, 36 to confine the cells in their proper position.

*Operation of deferred-action battery of Fig. 1*

To place the radio transmitter 11 and its deferred-action battery 16 in operation, the unit 10 is placed or dropped in a fluid such as water wherein it floats in a generally upright position. Water is admitted through the ports 25, 25 and rises in the battery container 13 by displacing the air in the container through the vent 22. This water is absorbed by the porous material 20 between the electrodes and wets the salt comprising the copper chloride paste in the interstices of the bronze screen 19. Electrolysis and a chemical reaction takes place in the cells and their activation is initiated. The chemical reaction then proceeds at a comparatively slow rate. After substantial activation has taken place, it is usually necessary, in a battery of the type under consideration which develops a relatively high anode voltage of 150 volts or more for the electron tubes of the transmitter, to expel any free water in the battery container 13 not absorbed by the copper chloride paste and the absorbent material between the various electrodes. The removal of the free water from the container reduces the short-circuiting currents which would otherwise flow in the battery between the more remote electrodes of the battery because of the relatively high voltage developed therebetween. These short-circuiting currents would, in turn, reduce the operating life of the battery.

As the battery cells approach substantial activation, a hydrogen gas is liberated by the cells and is used to expel the free water from the container 13. Before this free water is removed, however, it is necessary that the cells have ample time to acquire substantial activation which ordinarily means that all of the cells should at least become completely wet or saturated with water. This, in turn, requires that the battery and the closure mechanism 23 ensure that the plug 33 be disengaged or spaced from the vent 22 until substantial activation of all the cells has taken place. The dimensions of the ports 25, 25 and the vent 22 determine the rate at which the activating water enters the container 13 and displaces the air therein, while the connection of the fusible link 29 through the conductors 30 and 31 to the upper group of battery cells prevents a flow of current until the activating water has reached the top of the stack of battery cells. When the aforesaid upper group of cells has been substantially activated, a voltage is developed thereacross which causes a flow of current of sufficient magnitude to melt the fuse and release the plunger 26 under the influence of the loaded spring 28. The latter then forces the plug 33 into the vent 22 and effectively closes the latter. Consequently, any gas now released by the cells in the container 13 is effective to expel the free water through the ports 25, 25, thus conditioning the battery for complete operation and its intended operation in connection with the transmitter 11.

*Description and explanation of operation of battery assembly of Fig. 2*

Referring now to Fig. 2 of the drawings, there is represented a radio apparatus including a radio transmitter and a deferred-action battery assembly which is generally similar to that of Fig. 1. Accordingly, corresponding elements are designated by the same reference numerals. Instead of employing a single battery as in Fig. 1, the apparatus of Fig. 2 comprises a deferred-action battery assembly which includes a pair of fluid-activated batteries 16 and 46, at least one of which, namely, the battery 16 requires the removal of fluid therefrom upon substantial activation. To this end, the battery 16 is employed to develop the B voltage for the radio transmitter while the battery 46 of the assembly develops the filament voltage therefor. The cells of the battery 46 may be of similar materials and construction to the cells of battery 16. In spite of this similarity, it may be unnecessary to remove the free activating fluid from the battery compartment of battery 46 prior to complete activation of that battery. This is because that battery develops a relatively low voltage and the difficulties with short-circuiting currents are considerably reduced. An insulating partition 53 separates the two battery compartments and an air valve comprising a simple aperture 52 permits the water entering the ports 25, 25 to displace air in the container of battery 46 through the upper portion thereof.

The battery 46 includes a pair of conductors 54, 54 for supplying energy to the radio transmitter 11, and these conductors in turn are connected to the conductors 30 and 31 associated with the electrical fuse 29 in the compartment of the battery 16. The upper group of cells of the battery 16 are not connected in the circuit with the fuse 29 as in the Fig. 1 embodiment. A member 61 secured to the shelf 15 serves to retain the cells of the battery 46 in their proper position within their battery compartments. The dimensions of the ports 25, 25 and the vent 52 are ordinarily selected so that the battery 46 becomes saturated with water prior to the similar flooding of battery 16, thus permitting battery 46 to be activated first.

The operation of the apparatus 10 of Fig. 2 and the activation of the batteries thereof is quite similar to that of Fig. 1. When the apparatus is placed in water, the flooding of the cells of batteries 16 and 46 takes place in a manner similar to that explained above in connection with Fig. 1. Since it may be important that the B voltage not be applied to the radio transmitter 11 prior to the time the electron tubes thereof have been sufficiently heated by current supplied by the battery 46, it is desirable that battery 16 become activated after battery 46. This may be accomplished by proper dimensioning of the ports 25, 25 and the vent 52 as mentioned above and by ensuring that the fuse 29 is not melted until the battery 46 is almost completely activated. Expressed somewhat differently, the plug 33 of the closure mechanism 23 is not released to block the air vent 22 until the battery 46 is almost completely activated, thus ensuring that gases cannot be expelled from the compartment of battery 16 to effect a complete activation thereof until battery 46 is activated. When the cells of the battery 46 have been saturated and have reached substantial activation, the conductors 54, 54 connected to the terminal electrodes of that battery are effective to supply current through the conductors 30 and 31 and the coil spring 28 to the fuse 29. This current melts the fuse and releases the plug 33 into engagement with the aperture so that the gases released by the cells may expel the water through the ports 25, 25 of battery 16, thereby permitting that battery successfully to reach substantial activation followed by complete activation.

The heavy flow of current from the battery 46 through the fuse 29 of the closure mechanism 23 for the battery 16 performs another important beneficial function in addition to conditioning the battery 16 for substantial activation. It has been determined experimentally in deferred-action batteries employing battery cells of the type under consideration, that a relatively short-duration heavy flow of current drawn from the battery after it has become substantially activated serves to accelerate complete activation. Thus, the melting of the fuse 29 serves to perform the dual function of conditioning the battery 16 for substantial activation and the battery 46 for complete activation. It will be clear that after the fuse 29 has melted, the battery 46 is electrically isolated from the battery 16.

The use of a metallic member comprising the fuse 29 to hold the plunger 26 and its attached plug in disengaged relation to the vent 22 against the resistance of the spring 28 prior to the activation of battery 46 has another noteworthy feature. The fuse 29 has a sufficiently high tensile strength to withstand the shock of impact of the apparatus 10 when dropped in water from a height such as from an aircraft. Furthermore, it is effectively non-hygroscopic so that when the device is stored for an extended period in a lifeboat or raft, it does not absorb moisture as does paper, fabric, or similar materials, which moisture affects the tensile strength and impairs or ruins the usefulness of the last-mentioned materials for their intended purpose.

*Description and explanation of operation of Fig. 3 battery assembly*

Fig. 3 is a fragmentary representation of a portion of a deferred-action battery assembly which is quite similar to that represented in Fig. 2 of the drawings. The battery cells may be identical with those represented in Fig. 2 and the essential difference from the assembly of Fig. 2 resides in portions of the closure mechanism. The closure mechanism for the battery 16 of Fig. 3 includes means responsive in a time corresponding to sufficient displacement of the air in the compartment of battery 16 and substantial activation of battery 46 for obstructing the air vent 22, whereby gases liberated in the battery 16 expel the water admitted through the ports of the battery container and condition battery 16 for complete activation. This means comprises an electrical element in the form of a thermal time-delay switch 60 which is suitably mounted in the battery compartment for the battery 46. One of the conductors 54 of the battery 46 is connected to a terminal 55 which in turn is connected through a resistor 57 and conductor 30 to the fuse 29 while the other conductor 54 is connected by way of a terminal 56 to the other conductor 31 of the closure mechanism which in turn is connected to the other end of the fuse. The thermal time-delay relay 60 also includes a bimetallic temperature-responsive element 58 which is normally disengaged from a contact 59. However, when the cells of the battery 46 have been substantially activated in the manner described in connection with the battery assembly of Fig. 2, the battery 46 supplies energy through a circuit comprising terminal 55, resistor 57, conductor 30, fuse 29, conductor 31, and terminal 56. Since the resistor 57 has a relatively high resistance, the current which initially flows through the fuse 29 is quite low and ineffective to melt or rupture the fuse. However, the resistor 57 dissipates heat developed by this current flow and the bimetallic element 58, after the elapse of a predetermined time interval, is deflected into engagement with the contact 59, thereby short-circuiting the resistor 57 and permitting a relatively large flow of current through the fuse 29 to melt the latter. Thereafter, the plug 33 is released into engagement with the vent 22 in a manner previously described in connection with the apparatus of Fig. 2 and the battery 16 is conditioned so that substantial activation may take place.

For some applications it may be desirable to incorporate into the battery assembly a separate battery for controlling the melting of the fuse and the operation of the closure mechanism. Such application may arise in connection with a battery which must be adapted for use in water, the temperature of which may vary over a wide range. In that situation it may be desirable to provide a small separate fuse-melting battery of special and more costly chemicals which become actuated within a predetermined time after wetting despite the temperature of the actuating fluid. It will be clear that the construction and operation of such an assembly is essentially the same as that described in connection with the Fig. 2 embodiment of the invention.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A deferred-action battery comprising: a battery cell requiring wetting with fluid to initiate activation and subsequent removal of said fluid therefrom upon substantial activation; a container enclosing said cell and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

2. A deferred-action battery comprising: a battery cell requiring immersion in activating fluid to initiate activation and subsequent removal of said fluid therefrom upon substantial activation; a container enclosing said cell and including an air valve having a vent with a closure mechanism therefor open at about the time of said immersion and including a fluid valve having at least one part for admitting said fluid to displace the air in said container through said vent and thereby initiate said activation; and means for liberating a fluid-displacing gas in said container upon said substantial activation; said closure mechanism including means responsive in a time corresponding to sufficient displacement of the air in said container and said substantial activation for closing said vent, whereby said gas expels said fluid through at least one of said parts and conditions said battery for complete activation.

3. A deferred-action battery comprising: a battery cell requiring wetting with fluid to initiate activation and subsequent removal of said fluid therefrom upon substantial activation; a container enclosing said cell and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container for closing said vent, whereby said fluid-displacing gas expels said fluid through at least one of said ports and conditions said battery for operation.

4. A deferred-action battery comprising: a plurality of stacked battery cells requiring wetting with fluid to initiate activation and subsequent removal of said fluid therefrom upon substantial activation; and a container enclosing said cells and including a gas valve having a vent with a closure mechanism therefor open at about the time of said wetting and including a fluid valve having at least one port for admitting said fluid to displace the gas in said container through said vent and thereby initiate said activation; said cells being effective to liberate a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

5. A deferred-action battery comprising: a plurality of battery cells requiring wetting with fluid to initiate activation and subsequent removal of said fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and means including said cells for liberating fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said battery for operation.

6. A deferred-action battery comprising: a plurality of battery cells having electrodes and dry interelectrode spacers requiring wetting with fluid to initiate activation and subsequent removal of fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and a fluid-actuated gas generator for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels free fluid in said container through at least one of said ports and conditions said battery for operation.

7. A deferred-action battery comprising: a plurality of stacked battery cells requiring wetting with fluid to initiate activation and subsequent removal of said fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means electrically connected to a predetermined number of said cells and responsive in a time corresponding to sufficient displacement of the first-mentioned gas in said container and said substantial activation for closing said vent, whereby said fluid-displacing gas expels said fluid through at least one of said ports and conditions said battery for operation.

8. A deferred-action battery comprising: a plurality of stacked battery cells requiring wetting with fluid to initiate activation and subsequent removal of said fluid therefrom upon substantial activation; a container enclosing said cells and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism electrically connected to a predetermined number of said cells and including a thermal-responsive means responsive in a time corresponding to sufficient displacement of the first-mentioned gas in said container and said substantial activation for closing said vent, whereby said fluid-displacing gas expels said fluid through at least one of said ports and conditions said battery for operation.

9. A deferred-action battery comprising: a plurality of battery cells requiring wetting with fluid to initiate activation and subsequent removal of said fluid therefrom upon substantial activation; a container enclosing said cells and including a gas valve having a vent with a closure mechanism therefor comprising biasing means and an electrical fuse connected to at least some of said cells for retaining said closure mechanism open at about the time of said wetting and including a fluid valve having at least one port for admitting said fluid to displace the gas in said container through said vent and thereby initiate said activation; and means for liberating a fluid-displacing gas in said container upon said substantial activation; said fuse being melted by a current developed by said some of said cells at a time corresponding to sufficient displacement of the first-mentioned gas in said container and said substantial activation for releasing said closure mechanism to the influence of said biasing means and closing said vent, whereby said fluid-displacing gas expels said fluid through at least one of said ports and conditions said battery for operation.

10. A deferred-action battery assembly comprising: a pair of fluid-activated batteries at least one of which requires the removal of fluid therefrom upon substantial activation; a container enclosing said batteries and including a gas valve having a vent with a closure mechanism therefor open at about the time of said wetting and including a fluid valve having at least one port for admitting said fluid to displace the gas in said container through said vent and thereby initiate said activation; and means for liberating a fluid-displacing gas in said container upon said substantial activation; said closure mechanism including means responsive in a time corresponding to sufficient displacement of the first-mentioned gas in said container and said substantial activation for closing said vent, whereby said fluid-displacing gas expels said fluid through at least one of said ports and conditions said one battery for operation.

11. A deferred-action battery assembly comprising: a pair of fluid-activated batteries at least one of which requires the removal of fluid therefrom upon substantial activation; a pair of containers individually enclosing said batteries and individually including a gas valve having a vent and a fluid valve having at least one port for admitting said fluid to displace the gas in said containers through said vents and thereby initiate said activation; and means for liberating a fluid-displacing gas in one of said containers upon said substantial activation of said batteries; said one of said containers including a closure mechanism with means responsive in a time corresponding to sufficient displacement of the first-mentioned gas in said one container and said substantial activation of said batteries for closing said vent of said one container, whereby said fluid-displacing gas therein expels said fluid through at least one of said ports thereof and conditions said one battery for complete activation.

12. A deferred-action battery assembly comprising: a pair of fluid-activated batteries at least one of which liberates gases when wet with fluid; a container enclosing said batteries and having an air vent and having at least one port for admitting fluid to said container to displace air therein and initiate battery activation; and a closure mechanism for said vent which is open at about the time of said wetting and is responsive in a time corresponding to sufficient displacement of said air and substantial activation of said batteries for obstructing said vent, whereby said liberated gases expel said fluid through at least one of said ports and condition said battery for complete activation.

13. A deferred-action battery assembly comprising: a pair of fluid-activated batteries at least one of which liberates gases when wet with fluid; a pair of containers individually enclosing said batteries and individually having an air vent and having a port for admitting fluid to the container to displace air therein and initiate battery activation; and a closure mechanism for the air vent of the container for said gas-liberating battery, said mechanism being open at about the time of said wetting and responsive in a time corresponding to sufficient displacement of said air and substantial activation of the other of said batteries for obstructing said last-mentioned air vent, whereby said liberated gases expel said fluid admitted through the port of said last-mentioned container and condition said one battery therein for complete activation.

14. A deferred-action battery assembly comprising: a pair of fluid-activated batteries at least one of which liberates gases when wet with fluid; a pair of containers individually enclosing said batteries and individually having an air vent and having a port for admitting fluid to the container to displace air therein and initiate battery activation; and a closure mechanism for the air vent of the container for said gas-liberating battery, said mechanism being open at about the time of said wetting and including an electrical element connected in circuit with the other of said batteries and responsive in a time corresponding to sufficient displacement of said air and substantial activation of said other battery for closing said mechanism and obstructing said last-mentioned vent, whereby said liberated gases expel fluid admitted through the port of said last-mentioned container and condition said one battery therein for complete activation.

15. A deferred-action battery assembly comprising: a pair of fluid-activated batteries at least one of which liberates gases when wet with fluid; a pair of containers individually enclosing said batteries and individually having an air vent and having a port for admitting fluid to the container to displace air therein and initiate battery activation; and a closure mechanism including a closure for the air vent of the container for said gas-liberating battery, biasing means for said closure, and a fusible element connected in circuit with the other of said batteries for retaining said closure in spaced relation to said last-mentioned vent against the resistance of said biasing means but responsive in a time corresponding to sufficient displacement of said air and substantial activation of said other battery for releasing said closure to the influence of said biasing means and into obstructing engagement with said last-mentioned vent, whereby said liberated gases expel fluid admitted through the port of said last-mentioned container and condition said one battery therein for complete activation.

16. A deferred-action battery comprising: a battery cell requiring immersion in fluid to initiate activation and subsequent removal of said fluid therefrom upon substantial activation; a container enclosing said cell and including an air valve having a vent with a closure mechanism therefor open at about the time of said immersion and including a fluid valve having at least one port for admitting said fluid to displace the air in said container through said vent and thereby initiate said activation; said vent and said port being dimensioned to control the rate of air displacement in said container; and means for liberating a fluid-displacing gas in said container upon said substantial activation; said closure mechanism including means responsive in a time corresponding to sufficient displacement of the air in said container and said substantial activation for closing said vent, whereby said gas expels said fluid through at least one of said ports and conditions said battery for complete activation.

17. A deferred-action battery assembly comprising: a pair of fluid-activated batteries one of which requires the removal of fluid therefrom upon substantial activation; a pair of containers individually enclosing said batteries and individually including a gas valve having a vent and a fluid valve having at least one port for admitting said fluid to displace the gas in said containers through said vents and thereby initiate said activation; and means for liberating a fluid-displacing gas in one of said containers upon said substantial activation of said batteries; said one of said containers including a closure mechanism with an electrical fuse connected to the other of said batteries and ruptured at a time corresponding to sufficient displacement of the first-mentioned gas in said one container and said substantial activation of said other battery for closing said vent of said one container, whereby said fluid-displacing gas expels said fluid through at least one of said ports and conditions said battery for operation.

No references cited.